US006984708B2

(12) United States Patent
Liu et al.

(10) Patent No.: US 6,984,708 B2
(45) Date of Patent: Jan. 10, 2006

(54) SPANDEX OF A PARTICULAR COMPOSITION AND PROCESS FOR MAKING SAME

(75) Inventors: Hong Liu, Waynesboro, VA (US); Gregory L. Yoder, Charlottesville, VA (US); Robert O. Waldbauer, Jr., Waynesboro, VA (US)

(73) Assignee: Invista North America S.a.r.l., Wilmington, DE (US)

( * ) Notice: Subject to any disclaimer, the term of this patent is extended or adjusted under 35 U.S.C. 154(b) by 360 days.

(21) Appl. No.: 10/264,742

(22) Filed: Oct. 4, 2002

(65) Prior Publication Data

US 2004/0068080 A1    Apr. 8, 2004

(51) Int. Cl.
*C08G 18/65* (2006.01)
(52) U.S. Cl. .......................... 528/62; 528/76; 528/906
(58) Field of Classification Search .................. 528/76, 528/62, 906
See application file for complete search history.

(56) References Cited

U.S. PATENT DOCUMENTS

| 4,973,647 | A | 11/1990 | Bretches et al. |
| 5,000,899 | A | 3/1991 | Dreibelbis et al. |
| 5,362,432 | A | 11/1994 | Houser et al. |
| 5,616,676 | A | 4/1997 | Katsuo |
| 5,981,686 | A | 11/1999 | Waldbauer, Jr. |
| 6,403,216 | B1 | 6/2002 | Doi et al. |

FOREIGN PATENT DOCUMENTS

| JP | 58194915 A | 11/1983 |
| JP | 3279415 A | 12/1991 |

*Primary Examiner*—Rachel Gorr
(74) *Attorney, Agent, or Firm*—Robert B. Furr, Jr.; Anne I. Breiless

(57) ABSTRACT

The invention provides spandex having improved hysteresis and a method for making such spandex. The spandex of the invention comprises the polyurethaneurea reaction product of:
(a) poly(tetramethylene ether) glycol
(b) 1-isocyanato-4-[(4-isocyanatophenyl)methyl]benzene wherein the mole ratio of diisocyanate to glycol is from about 1.52 to about 2.04; and
(c) a mixture of chain extenders comprising:
from about 35 to about 55 mole percent ethylene diamine; and
from about 45 to about 65 mole percent 1,2-propanediamine.

5 Claims, 1 Drawing Sheet

SPANDEX OF A PARTICULAR COMPOSITION AND PROCESS FOR MAKING SAME

BACKGROUND OF THE INVENTION

1. Field of the Invention

The present invention relates to spandex comprising a particular composition, especially a polyurethaneurea spandex made with a particular combination of diamine chain extenders.

2. Description of Background Art

A variety of compositions for polyurethaneurea spandex have been disclosed, for example in U.S. Pat. No. 5,981,686, U.S. Pat. No. 6,403,216, and U.S. Pat. No. 5,000,899 and in Japanese Published Patent Applications JP03-279415 and JP58-194915. However, such compositions can have high hysteresis and can form unstable solutions.

An improved composition for polyurethaneurea spandex is still needed.

SUMMARY OF THE INVENTION

The present invention provides a spandex comprising the polyurethaneurea reaction product of poly(tetramethylene ether) glycol, 1-isocyanato-4-[(4-isocyanatophenyl)methyl] benzene wherein the mole ratio of diisocyanate to glycol is at least about 1.52 and the mole ratio of diisocyanate to glycol is at most about 2.04, and a mixture of chain extenders comprising:

from about 35 mole to about 55 mole percent ethylene diamine; and from about 45 mole percent 1,2-propanediamineto about 65 mole percent 1,2-propanediamine.

The invention also provides a process for making such a spandex.

DETAILED DESCRIPTION OF THE INVENTION

Figure 1:
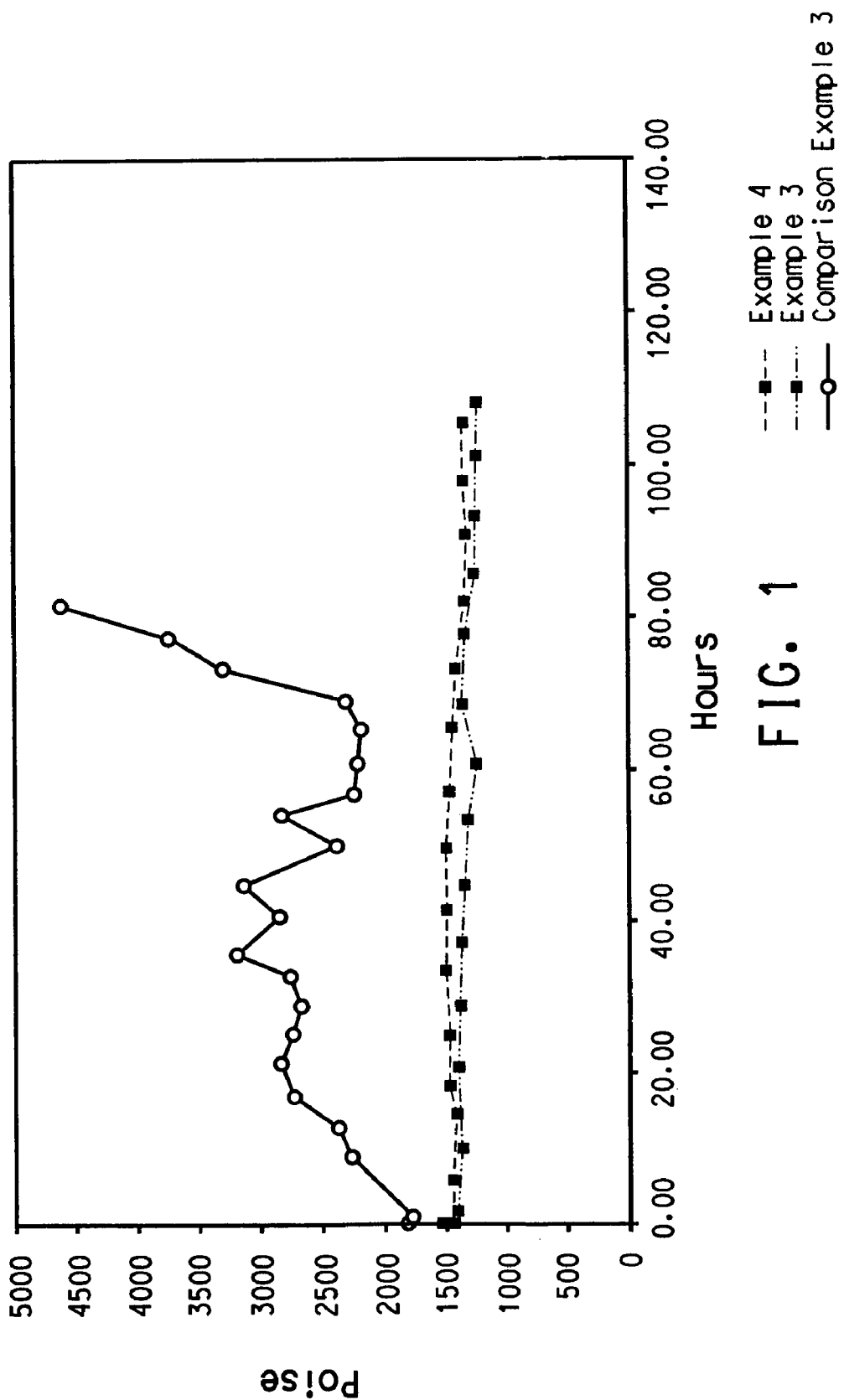
FIG. 1 presents the effect on polyurethaneurea solution viscosity of the amount of 1,2-propanediamine in the mixture of chain extenders.

It has now been found that spandex comprising a particular composition of polyurethaneurea has unexpectedly low hysteresis and that the polyurethaneurea has unexpectedly good solution viscosity stability. The term "hysteresis" as used herein means the difference between load power and unload power. Such spandex can be used in woven, knit, and nonwoven fabrics, and can provide stretch and recovery in personal care articles such as diapers.

As used herein, spandex means a manufactured fiber in which the fiber-forming substance is a long chain synthetic polymer comprised of at least 85% by weight of a segmented polyurethane.

The spandex of the invention comprises the polyurethaneurea reaction product of poly(tetramethylene ether) glycol, 1-isocyanato-4-[(4-isocyanatophenyl)methyl] benzene, and a mixture of chain extenders comprising about 35 to 55 mole percent ethylene diamine and about 45 to 65 mole percent 1,2-propanediamine, typically about 40 to 50 mole percent ethylene diamine and about 50 to 60 mole percent 1,2-propanediamine. The mole ratio of diisocyanate to polymeric glycol (the "capping ratio") can be about 1.52 to 2.04.

When the 1,2-propanediamine content and/or the ratio of diisocyanate to glycol are higher, load power and hysteresis can be undesirably increased. When the 1,2-propanediamine content is too low, the viscosity stability of solutions of such polyurethaneurea can suffer.

The poly(tetramethylene ether) glycol can have a number average molecular weight of about 1600 to 2500 daltons. The glycol can contain acids, acid-producing compounds, or catalysts, which can be added before the capping step, for example 10 to 100 parts per million based on polymeric glycol weight of phosphoric acid esters, phosphoric acid, benzenesulfonic acid, p-toluenesulfonic acid, sulfuric acid, stannous octoate, alkyl titanates, and the like. It is unnecessary to include, in the polymeric glycol, diols having a low molecular weight below about 250 Daltons, such as butanediol, hexanediol, 1,4-cyclohexanedimethanol, and the like, and the polymeric glycol can be substantially free of such diols, meaning less than about 5 mole percent of such diols can be present.

To control polyurethaneurea molecular weight, at least one monofunctional chain terminator can be used, for example diethylamine, di-n-butylamine, n-pentylamine, n-hexylamine, cyclohexylamine, n-heptylamine, methylcyclohexylamines (for example 1-amino-3-methylcylohexane, 1-amino-2-methylcyclohexane, and 1-amino-3,3,5-trimethylcyclohexane), n-dodecylamine, 2-aminonorbornane, 1-adamantanamine, ethanolamine, methanol, ethanol, n-butanol, n-hexanol, n-octanol, n-decanol, and mixtures thereof. Primary amine terminators such as n-hexylamine, cyclohexylamine, methylcyclohexylamines, and ethanolamine are preferred. Diethylenetriamine can also be used at low levels in the chain extension step, provided the advantages of the invention are not compromised.

A variety of additives can also be used in the spandex and the process of the invention, provided they do not detract from its beneficial aspects. Examples include delustrants such as titanium dioxide; stabilizers such as hydrotalcite, mixtures of huntite and hydromagnesite (for example at 0.2 to 0.7 weight percent based on polyurethaneurea), barium sulfate, hindered amine light stabilizers, UV screeners, hindered phenols, and zinc oxide; dyes and dye enhancers; and the like.

In the process of the invention, the poly(tetramethylene ether) glycol is contacted with 1-isocyanato-4-[(4-isocyanatophenyl)methyl] benzene to form a capped glycol wherein the isocyanate moiety is present at about 2.2 to 2.9 weight percent, based on weight of capped glycol. The capped glycol is mixed with a suitable solvent, for example dimethylformamide, dimethylacetamide, or N-methylpyrrolidone, to form a solution of capped glycol which is then contacted with a mixture of chain extenders comprising about 35 to 55 mole percent ethylene diamine, typically about 40 to 50 mole percent ethylene diamine, and about 45 to 65 mole percent 1,2-propanediamine, typically about 50 to 60 mole percent 1,2-propanediamine, to form a polyurethaneurea solution. The polyurethaneurea solution can have a falling ball viscosity of about 1000 to 4000 poise and can be wet- or dry-spun to form the spandex.

The process can be carried out as batch steps (especially the steps of forming the capped glycol and the polyurethaneurea) or continuously.

In the Examples, the amount of NCO moiety in the capped glycol is reported as a weight percent and was calculated from the following relationship:

$$\% \text{ NCO} = \frac{100 \times (2 \times \text{NCO fw} \times (\text{C.R.} - 1))}{\text{glycol mw} + (\text{C.R.} \times \text{diisocyanate mw})} \quad (1)$$

wherein "fw" means formula weight, "mw" means molecular weight, "C.R." means Capping Ratio (the molar ratio of diisocyanate to polymeric glycol), "glycol" means polymeric glycol, and "NCO" refers to the isocyanate moiety, whose formula weight is 42.02.

The viscosity of the polyurethaneurea solution was determined in accordance with the method of ASTM D1343-69 with a Model DV-8 Falling Ball Viscometer (Duratech Corp., Waynesboro, Va.), operated at 40° C., and is reported in poise.

Intrinsic viscosity ("IV") of the polyurethaneurea was determined by comparing the viscosity of a dilute solution of the polymer in DMAc to that of DMAc itself at 25° C. ("relative viscosity" method) in a standard Cannon-Fenske viscometer tube according to ASTM D2515 and is reported in dl/g. The intrinsic viscosity of the polyurethaneurea of which the spandex is comprised and which is prepared and spun in the process of the invention can be about 0.85 to 1.05. The molecular weights of the polyurethaneurea were measured by gel permeation chromatography; its weight average molecular weight ("$MW_w$") can be about 80,000 to 105,000, its number average molecular weight ("$MW_n$") can be about 20,000 to 38,000, and its polydispersity can be about 2.4 to 3.6. Higher polyurethaneurea IV and molecular weight can give spandex having higher load power and hysteresis, but the effect of changing weight percent NCO and diamine chain extender ratios is substantially the same as at lower IV's and molecular weights; it is estimated that an IV change of more than 0.1 would be needed to cause a significant change in hysteresis.

The mechanical properties of the spandex were measured in accordance with the general method of ASTM D 2731-72. Three filaments, a 2-inch (5-cm) gauge length and a zero-to-300% elongation cycle were used for each of the measurements. The samples were cycled five times at a constant elongation rate of 50 cm per minute. Load Power, the stress on the spandex during initial extension, was measured on the first cycle at 100% and 200% extension and is reported in deciNewtons/tex ("dN/tex"). Unload Power, the stress at extensions of 200% and 100% on the fifth unload cycle, is also reported in deciNewtons per tex. Percent elongation at break and tenacity at break were measured on the sixth extension.

In the Tables, "Comp." indicates a comparison example. The chain extender, other than the amount of 1,2-propanediamine ("PDA") indicated, was ethylenediamine. All the samples of the invention had a tenacity at break of greater than 0.7 dNtex and an elongation-at-break of greater than 425%. "LP" means load power, "UP" means unload power, and both are reported in dN/tex. Hysteresis was calculated as the difference between load power and unload power and is also reported in dN/tex. "100%", "200%", and "300%" refer to the extensions at which the power and hysteresis were measured. In Table I, each error range is for a 95% confidence interval, based on determinations made on 4 wound spandex packages, each package sampled 6 times.

EXAMPLE 1

Poly(tetramethylene ether) glycol (250.0 grams; Terathane® 2000, a registered trademark of E. I. du Pont de Nemours and Company) was mixed with 52.11 grams of 1-isocyanato-4-[(4-isocyanatophenyl)methyl] benzene in a glass reaction kettle. The mixture was heated to 80° C. with a heating mantle and stirred for 90 minutes to make a capped glycol with 2.4 wt % NCO (calculated). The capped glycol was dissolved in 572.38 grams of dimethylformamide, and 85.51 grams of 2.00 meq/g chain extender solution (EDA/PDA mole ratio 35/65 in dimethylformamide) and 3.21 grams of 2.00 meq/g chain terminator solution (ethanolamine in dimethylformamide) were added with rapid stirring. The resulting polyurethaneurea solution had a solids content of 32.0 wt %, based on total weight of solution, and the polyurethaneurea's intrinsic viscosity was 0.94 dl/g. An additive slurry was thoroughly mixed into the solution to achieve in the final fiber 0.5 wt % Methacrol® 2462B (a registered trademark of E. I. du Pont de Nemours and Company for a polymer of bis(4-isocyanatocyclohexyl) methane and 3-t-butyl-3-aza-1,5-pentanediol), 1.5 wt % Cyanox® 1790 (a registered trademark of Cytec Industries 2,4,6-tris(2,6-dimethyl-4-t-butyl-3-hydroxybenzyl)isocyanurate), and 10 ppm by weight of an anthraquinone brightener. The spinning solution was pumped from a storage tank, metered by a gear pump, heated to about 55° C., and extruded through spinneret holes into a round spinning cell provided with a co-current flow of hot nitrogen of 405° C. to remove the solvent. The four filaments were coalesced into one 40 denier (44 dtex) fiber which was passed around a feed roll at 466 m/min, across a finish roll, around a second feed roll at 492 m/min, and wound-up at 548 m/min. Fiber properties are presented in Table I.

EXAMPLE 2

Polymer and fiber were prepared substantially as described in Example 1, except that the % NCO in the capped glycol was increased to 2.8. The IV of the polyurethaneurea in the solution was 0.85, its $MW_n$ was 24,200, its $MW_w$ was 84,600, and its polydispersity was 3.5. Fiber properties are presented in Table I.

COMPARISON EXAMPLE 1

Polymer and fiber were prepared substantially as described in Example 1, except that the % NCO in the capped glycol was increased to 3.2. The IV of the polyurethaneurea in the solution was 1.05, its $MW_w$ was 100,700, its $MW_n$ was 27,000, and its polydispersity was 3.7. Fiber properties are presented in Table I.

COMPARISON EXAMPLE 2

Polymer and fiber were prepared substantially as described in Example 2, except that the amount of 1,2-propanediamine was increased to 74 mole percent of total chain extender, and the amount of ethylene diamine was correspondingly reduced. The IV of the polyurethaneurea in the solution was 0.91, its $MW_w$ was 98,000, its $MW_n$ was 25,000, and its polydispersity was 3.9. Fiber properties are presented in Table I.

TABLE I

| Example | 1 | 2 | Comp. 1 | Comp. 2 |
|---|---|---|---|---|
| % NCO | 2.4 | 2.8 | 3.2 | 2.8 |
| Capping Ratio | 1.69 | 1.82 | 1.95 | 1.82 |
| Mole % PDA | 65 | 65 | 65 | 74 |
| LP @ 100% | 0.041 +/− 0.001 | 0.045 +/− 0.001 | 0.0722 +/− 0.0005 | 0.051 +/− 0.001 |
| LP @ 200% | 0.091 +/− 0.003 | 0.089 +/− 0.004 | 0.138 +/− 0.002 | 0.110 +/− 0.003 |
| LP @ 300% | 0.21 +/− 0.01 | 0.18 +/− 0.01 | 0.254 +/− 0.004 | 0.26 +/− 0.01 |
| UP @ 100% | 0.126 +/− 0.001 | 0.0112 +/− 0.0005 | 0.0130 +/− 0.0002 | 0.0133 +/− 0.0002 |
| UP @ 200% | 0.019 +/− 0.001 | 0.019 +/− 0.001 | 0.0209 +/− 0.0003 | 0.0215 +/− 0.0001 |
| Hytseresis @ 100% | 0.029 | 0.034 | 0.059 | 0.037 |
| Hysteresis @ 200% | 0.072 | 0.071 | 0.117 | 0.089 |

The data in Table I show that spandex of the invention had unexpectedly lower load power and hysteresis than spandex comprising the polyurethaneurea reaction product of poly(tetramethylene ether) glycol and high proportions of 1,2-propanediamine and diisocyanate (the latter as indicated by high % NCO in the capped glycol of Comparison Example 1).

EXAMPLE 3

Capped glycol having 2.4 weight percent NCO was prepared in a first water-jacketed stirred tank from 324.8 kg of poly(tetramethylene ether) glycol having a number average molecular weight of 2029 (Terathane® 2000), 68.2 kg of 1-isocyanato-4-[(4-isocyanatophenyl)methyl]benzene, and 0.64 kg of n-butanol. Dimethylformamide was added to dissolve the capped glycol, the resulting solution was transferred to a second stirred water-jacketed tank, the first tank was rinsed with additional dimethylformamide, and the rinse was also transferred to the second tank, where the polymer content was adjusted to about 36 weight percent. A pigment slurry was mixed into the capped glycol solution in an amount such that the subsequent polyurethaneurea solution contained 3 weight percent titanium dioxide, 0.3 weight percent nonionic dispersant, and 10 ppm of an anthraquinone brightener, based on polymer weight. While the mixture of solvent, capped glycol, and pigments was stirred at below 10° C., 96 kg of a 35/65 mole/mole mixture of ethylene diamine and 1,2-propanediamine chain extenders (7.0 weight percent in dimethylformamide) was added until the solution viscosity was about 1650 poise. A chain terminator solution (7.43 kg, 30.55 wt % ethanolamine in dimethylformamide) was then added, followed by 7.06 kg of 26.91 wt % acetic anhydride in dimethylformamide to 'neutralize' the excess ethanolamine. The polymer solids level was adjusted to about 32 weight percent, based on total solution weight, by the addition of more dimethylformamide. The resulting polyurethaneurea solution was then transferred to a third stirred tank where 13.88 kg of a slurry of magnesium stearate, 4.05 kg of a solution of Methacrol® 2462B, and 6.40 kg of Cyanox® 1790 were added so that the solution contained 0.28 weight percent magnesium stearate, 0.5 weight percent Methacrol® 2462B, and 1.5 weight percent Cyanox® 1790, based on polyurethaneurea weight. The solution was then transferred to an unstirred storage tank from which samples were removed at intervals for testing. Over the next 108 hours, during which freshly prepared polyurethaneurea solution was periodically added and solution was continuously removed for fiber spinning, the solution had shown an advantageously low maximum falling ball viscosity of only 1443 poise, as summarized in Table II and illustrated in FIG. 1. The polymer solution was forced from the storage tank with pressurized nitrogen, preheated to about 45° C., metered by a gear pump, and extruded through spinnerets into a rectangular spinning cell supplied with both cross flow and co-current air about 200° C. to remove the solvent. The filaments were coalesced by false twisting at the bottom of the spinning cell into threadlines, supplied with a finish, passed around a feed roll at 550 m/min and wound up at 480 m/min. The polyurethaneurea in the fiber was determined to have an IV of 0.98, a $MW_n$ of 36,900, a $MW_w$ of 93,300, and a polydispersity of 2.5. Fiber properties are presented in Table III.

EXAMPLE 4

A polyurethaneurea solution was prepared substantially as described in Example 3, but the capped glycol had 2.8 weight percent NCO. During 105 hours in the storage tank, during which freshly prepared polyurethaneurea solution was periodically added and solution was continuously removed for fiber spinning, the solution had shown a maximum falling ball viscosity of only 1534 poise, as summarized in Table II and illustrated in FIG. 1. The IV of the polyurethaneurea in the fiber was 1.00. Fiber properties are presented in Table III.

COMPARISON EXAMPLE 3

A polyurethaneurea solution was prepared substantially as described in Example 3, but the capped glycol had 2.4 weight percent NCO, the mole ratio of ethylene diamine to 1,2-propanediamine in the chain extender mixture was 60/40. After 81 hours in the storage tank, during which freshly prepared polyurethaneurea solution was periodically added and solution was continuously removed for fiber spinning, the falling ball viscosity had risen to an unsatisfactory 4626 poise, as summarized in Table II and illustrated in FIG. 1. The IV of the polyurethaneurea in the fiber was 1.00. Fiber properties are presented in Table III.

TABLE II

| Example | 3 | 4 | Comp. 3 |
|---|---|---|---|
| % NCO | 2.4 | 2.8 | 2.4 |
| Mole % PDA | 65 | 65 | 40 |
| Time, hrs | 108 | 105 | 81 |
| Maximum poise | 1443 | 1534 | 4626 |

The data in Table II show that the solution viscosity remained satisfactorily low for polyurethaneurea reaction product of poly(tetramethylene ether) glycol, 1-isocyanato-4-[(4-isocyanatophenyl)methyl]benzene, and a 35/65 mole ratio of ethylene diamine and 1,2-propanediamine chain extenders but rose to unsatisfactorily high levels when the amount of 1,2-propanediamine was reduced to 40 mole percent. Interpolation of the data for Example 3 and Comparison Example 3 shows that a still satisfactory maximum of about 4000 poise would be reached at about 45 mole percent 1,2-propanediamine.

TABLE III

| Example | 3 | 4 | Comp. 3 |
|---|---|---|---|
| % NCO | 2.4 | 2.8 | 2.4 |
| Mole % PDA | 65 | 65 | 40 |
| LP @ 100% | 0.0503 +/− 0.0002 | 0.0573 +/− 0.0003 | 0.0503 +/− 0.0002 |
| LP @ 200% | 0.1183 +/− 0.0009 | 0.132 +/− 0.0015 | 0.1101 +/− 0.0007 |
| LP @ 300% | 0.207 +/− 0.002 | 0.224 +/− 0.002 | 0.162 +/− 0.002 |
| UP @ 100% | 0.0142 +/− 0.0001 | 0.0138 +/− 0.0002 | 0.0132 +/− 0.0001 |
| UP @ 200% | 0.0229 +/− 0.0001 | 0.0232 +/− 0.0003 | 0.0204 +/− 0.0001 |
| Hysteresis @ 100% | 0.036 | 0.044 | 0.037 |
| Hysteresis @ 200% | 0.095 | 0.109 | 0.090 |

Examination of the data in Table III shows that the unload power of Comparison Example 3 is undesirably low, compared to Examples 3 and 4. The differences in fiber properties between those of Table I and Table III are believed to be due to differences in spinning conditions.

What is claimed is:

1. Spandex comprising the polyurethaneurea reaction product of:
   (a) poly(tetramethylene ether) glycol
   (b) 1-isocyanato-4-[(4-isocyanatophenyl)methyl]benzene wherein the mole ratio of diisocyanate to glycol is from about 1.52 to about 2.04; and
   (c) a mixture of chain extenders comprising:
      from about 35 to about 55 mole percent ethylene diamine; and
      from about 45 to about 65 mole percent 1,2-propanediamine;
   wherein the poly(tetramethylene ether) glycol is substantially free of diols having molecular weights of less than about 250 daltons.

2. The spandex of claim 1 wherein the poly(tetramethylene ether) glycol has a number average molecular weight of from about 1600 daltons to about 2500 daltons.

3. The spandex of claim 1 wherein the mixture of chain extenders comprises from about 40 to about 50 mole percent ethylene diamine, and from about 50 to about 60 mole percent 1,2-propanediamine.

4. The spandex of claim 1 wherein the mixture of chain extenders further comprises at least one primary amine chain terminator.

5. Fabrics comprising the spandex of claim 4.

* * * * *